Inventor:
Howard C. Rose
By Pond & Wilson
Attys.

H. C. ROSE.
CIRCULAR MILLING MACHINE.
APPLICATION FILED JUNE 16, 1917.

1,421,030.

Patented June 27, 1922.
4 SHEETS—SHEET 4.

Inventor:
Howard C. Rose
By Pond & Wilson
Attys.

UNITED STATES PATENT OFFICE.

HOWARD C. ROSE, OF DETROIT, MICHIGAN, ASSIGNOR TO THE INGERSOLL MILLING MACHINE COMPANY, OF ROCKFORD, ILLINOIS, A CORPORATION OF ILLINOIS.

CIRCULAR MILLING MACHINE.

1,421,030.   Specification of Letters Patent.   Patented June 27, 1922.

Application filed June 16, 1917. Serial No. 175,170.

*To all whom it may concern:*

Be it known that I, HOWARD C. ROSE, a citizen of the United States, residing at Detroit, on the county of Wayne and State of Michigan, have invented certain new and useful Improvements in Circular Milling Machines, of which the following is a specification.

This invention pertains in general to the art of milling machines, and has more particular reference to machines of this class especially adapted for milling or surfacing flat faces.

Prior to my present invention surfacing milling machines have been equipped with a plurality of rotatable surfacing cutters beneath which the work was carried on a reciprocating work carriage. The time necessarily consumed by the idle travel of the work carriage, however, so reduced the effective working time of the machines that they were unequal in many instances to the requirements imposed by modern efficiency methods.

In this invention I have aimed, primarily, to provide a surfacing milling machine which will be especially adapted and qualified to accurately and expeditiously surface large numbers of parts and castings in a short time and at a minimum cost.

In furtherance of this general object I have devised what might be termed a circular milling machine. In other words, a machine is provided in which a work holding unit and a cutter holding unit carrying, respectively, a plurality of circumferentially arranged work holders and cutters, are rotatably mounted and operated so that the work and cutters travel continuously in circular paths, the work being placed in position on the work unit at a loading station and being surfaced by reason of relative movement between the cutters and work. In the present instance, this relative movement is secured by rotating the work and cutter units at different speeds but in such timed relation that work may be positioned on each holder as it passes the loading station and will be surfaced during its cycle or travel about the machine and may be removed when said loading station is again reached. By this arrangement a series of castings may be simultaneously and continuously operated upon, as they travel around the machine, and when each reaches the loading station in its travel the surfacing operation thereon has been completed so that the castings may be successively removed and replaced by unsurfaced castings.

These and other objects and attendant advantages will be apparent as the invention becomes better understood by reference to the following description when considered in connection with the accompanying drawings illustrating one practical embodiment of my invention, and in which—

A general statement of the function and operation of the particular machine shown in the drawings as an illustration of one embodiment of my improvements will, I believe, facilitate an understanding of the invention. Its purpose is to surface or machine at a minimum cost flat faces or surfaces of a large number of castings or parts, such for instance, as the cover plate faces of transmission casings. In the present machine a constantly revolving work table carries a plurality of work holding devices successively past a loading and unloading station at which each finished or surfaced casing or part is removed and replaced by an unsurfaced casing. The resurfacing operation is performed upon each casing as it is carried in a circular path around the machine from the loading station back to the station again. A plurality of circumferentially spaced, concentrically mounted revolving cutters, one less in number than the work holding devices, carried above the work table by a rotary head preferably concentric with the work table, are moved as a unit in the same direction as the work table but at a faster speed so that each casing in its cycle of travel will be engaged by a cutter just after leaving the loading station, which cutter will, because of its faster movement, travel over and surface the casing as they both move around the machine, and leave the casing just before the arrival of the casing at the loading station, the loading and unloading station being designated as the arc of the circumference of the machine in which the cutters are disposed between the successive work holding devices and out of engagement with the work. Thus the parts or casings are finished in succession at regular, timed intervals, dependent upon the speeds at which the cutter and work holding units are rotated and on the number of cutters and work holding devices employed, and while one finished part is being removed and replaced by a new one the other parts are in various stages of completion at various points around the machine.

Figure 1:
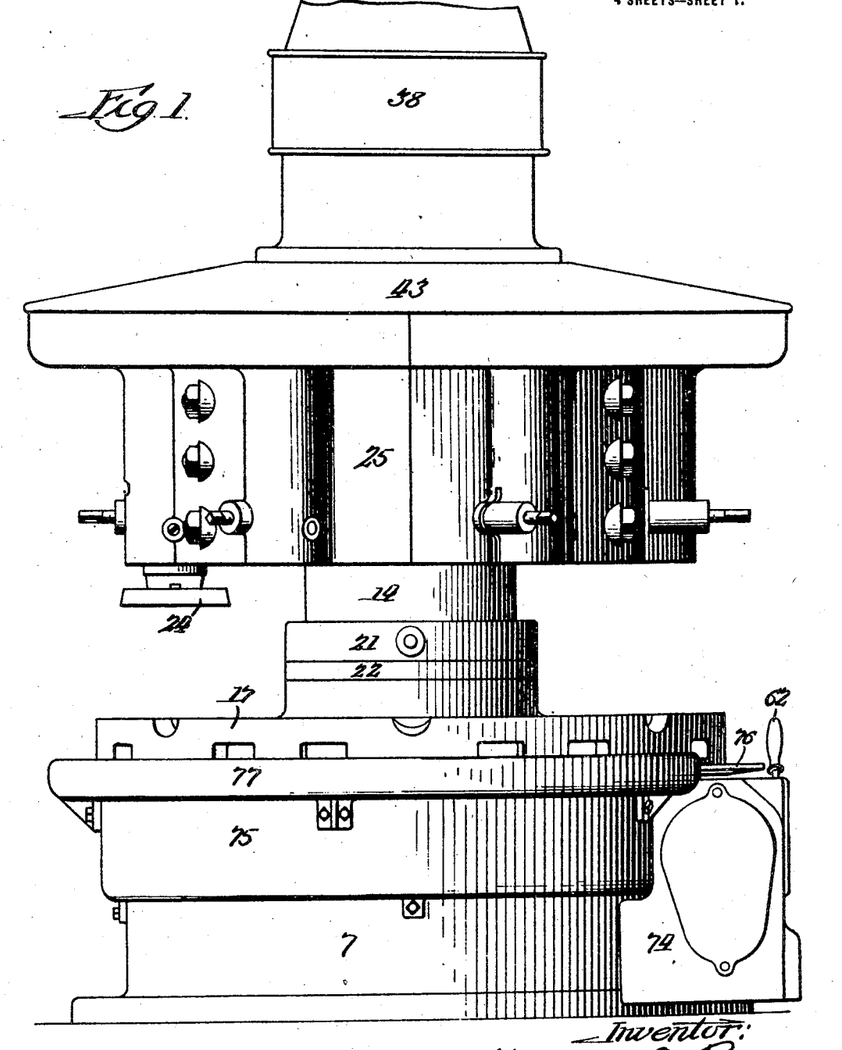
Figure 1 is a front elevation of a machine embodying my improvements, the two foremost cutter-holding spindles being briefly shown.
Figure 2:
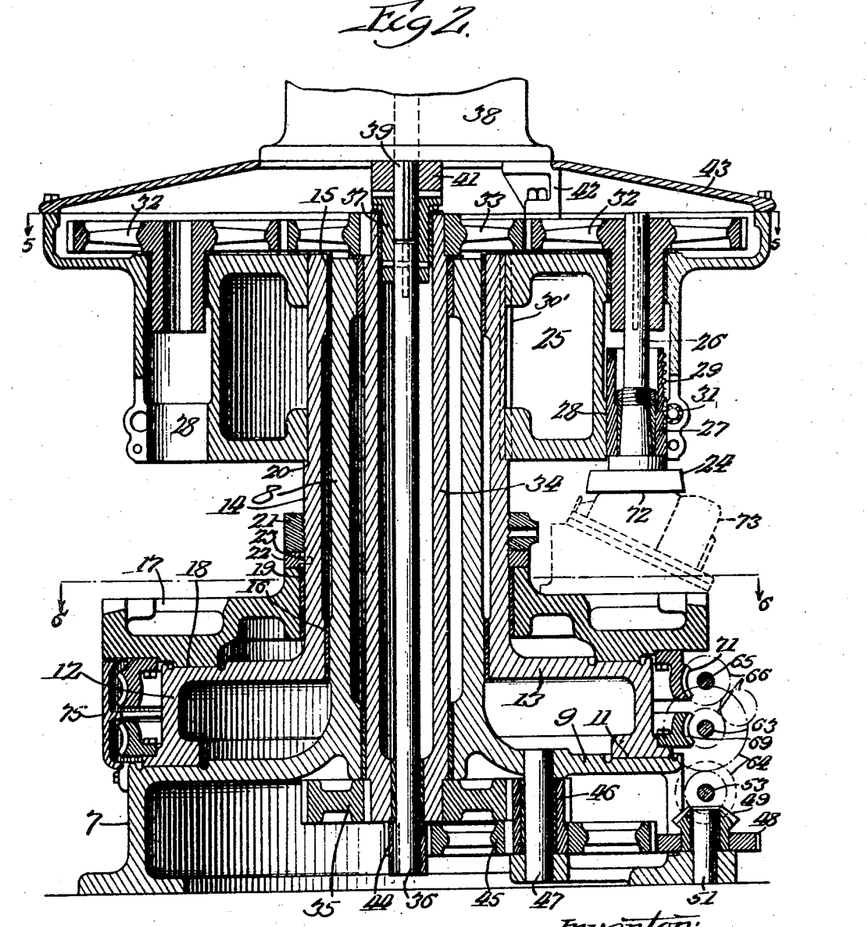
Fig. 2 is a vertical sectional view through the machine in which a portion of the drive mechanism is shown diagrammatically and the spindle at the left hand side of the machine is omitted.

Referring particularly to Fig. 2, a circular base designated generally by reference character 7 has formed integrally therewith an upstanding central column 8 about which a work table and a tool carrier or spindle head revolve. The horizontal wall 9 of the base is provided at its upper side with an annular bearing face 11 upon which slidably rests the base of a spindle head holder designated generally by reference character 12. This spindle head holder, of the same general shape as the base 7, consists of a circular base portion slidable on the base as described, a horizontal wall 13 and a central column 14 having bearings at its upper and lower ends 15 and 16, respectively, on the column 8. The spindle head holder is, therefore, capable of rotation upon the base 7 around the central column 8 by which it is guided and steadied.

The spindle head holder in turn rotatably supports a work table in substantially the same manner as said spindle head holder is supported by the base 7. The work table or work carrying unit designated generally by reference character 17 rests and is slidable upon the annular face 18 on the top of the wall 13 and has a central bearing 19 on the column 14. A lock nut 21 threaded onto the column 14 holds the work table and cutter head holder against displacement. A washer 22 interposed between the lock nut and table and held against rotation by a lug 23 connecting the washer and column 14 eliminates friction between the rotating table 17 and the stationary lock nut. The work table is designed to carry a plurality of circumferentially spaced work holding devices of which there are seven in the present instance. Only one of the work holding devices is illustrated (Fig. 2) and that is shown diagrammatically since it may be of any suitable or preferred construction and will in most instances be of special design for the particular work to be carried. It will be manifest, however, that the top of the work table is, as shown, adapted for carrying work at a plurality of circumferentially spaced points.

Figure 5:
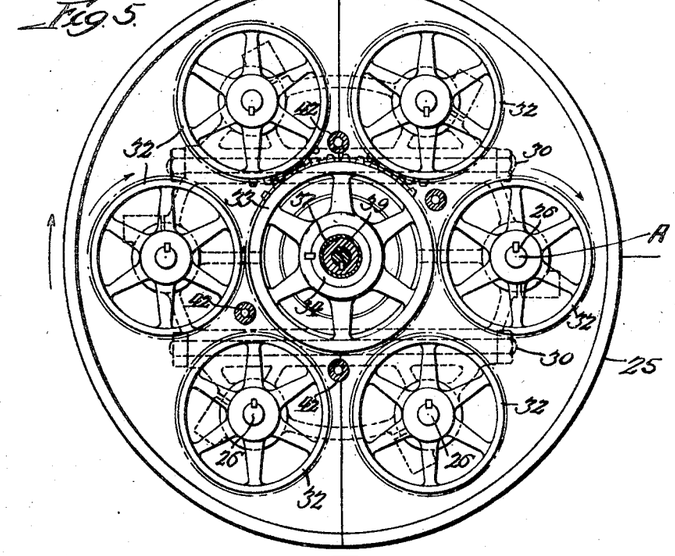
Figs. 5 and 6 are plan sectional views on reduced scales taken substantially on the lines 5—5 and 6—6, respectively, of Fig. 2.

The cutting tools, carried above the work table and in the present instance shown in the form of face plate cutters 24, are secured to the spindles revolubly mounted on a spindle head or tool carrying unit, designated generally by character 25, which seats upon the annular shoulder 20 of the column 14 and is fixedly secured thereto so that the column and head will rotate together. The spindle head is preferably formed in two semi-circular sections divided vertically, as shown in Fig. 5, tie bolts 30 being employed to rigidly bind the sections together, and, together with the key 30', secure them to the column 14. The cutter-carrying spindles, of ordinary milling machine construction and six in number, are equally spaced circumferentially about the head 25. As shown in Fig. 2, a spindle 26 is journaled in and held against longitudinal movement with respect to a carrier 27 which is slidable longitudinally in a bore 28 in the head 25 and is provided with a rack 29 with which a pinion 31 mounted in the head 25 meshes. By rotating this pinion, the spindle, and consequently its cutter, may be adjusted toward and from the work. The upper end of the spindle is splined in the hub of a gear 32, the hub being journaled in the spindle head 25. As shown in Fig. 5, the gears 32 of the several spindles, disposed at the top of the spindle head 25, mesh with the central drive gear 33 so that all the spindles will be driven simultaneously and at one and the same speed by the one drive gear.

The mechanism which drives the cutter spindles through the medium of the central drive gear 33 and also revolves the work table and spindle head about their respective central column, will now be described. A heavy sleeve 34 journaled within the column 8 and projecting beyond the opposite ends thereof, is keyed or otherwise rigidly secured at its upper end to the drive gear 33 and at its lower end to a spur gear 35. A drive shaft 36 is journaled directly in the lower end of the sleeve 34 and indirectly in its upper end through the intermediary of a bushing 37 to which the shaft is rigidly secured, said bushing having a ball thrust bearing against the end of the sleeve 34. An electric motor 38 employed for driving the shaft 36, is connected thereto through the agency of a clutch including a serrated part 41 keyed to the shaft 39 and engaging a serrated face on the bushing 37. The motor is supported upon and carried by the head 25 by means of legs 42 detachably connected to said head so that the motor may be very easily removed from the machine without removal of any of the driving parts. A top housing 43 secured to the spindle head 25 incloses the gears at the top thereof. By arranging the motor in this manner, it is not necessary for any of the parts to project below the floor line, although it should be understood that the invention contemplates any suitable form of drive. Upon the lower end of the shaft 36 is fixed a spur pinion 44 which meshes with a spur gear 45 rigidly secured to the hub of a pinion 46 loosely journaled on a fixed stub shaft 47, the pinion 46 being in mesh with the gear 35. By means of the drive mechanism thus far described the cutter spindles may be driven in unison through the shaft 36, gears 44, 45, 46 and 35, the sleeve 34 and the central drive gear 33.

Figure 3:
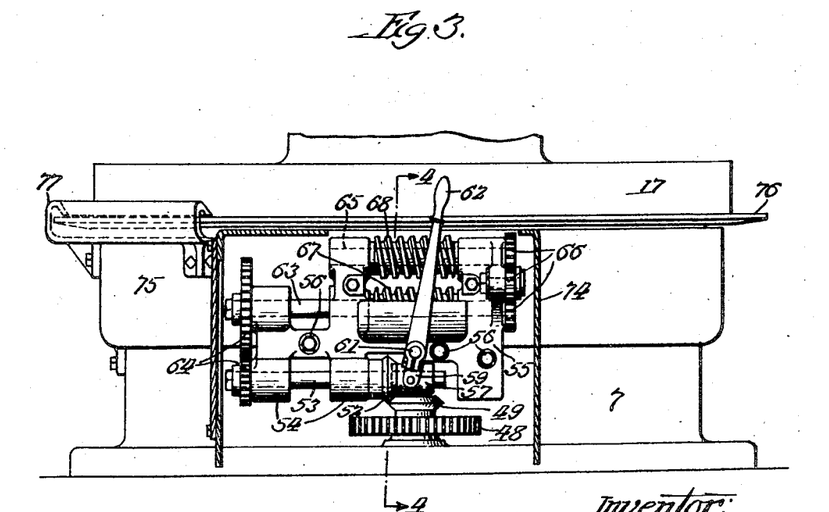
Fig. 3 is a side elevation of the drive mechanism.
Figure 4:
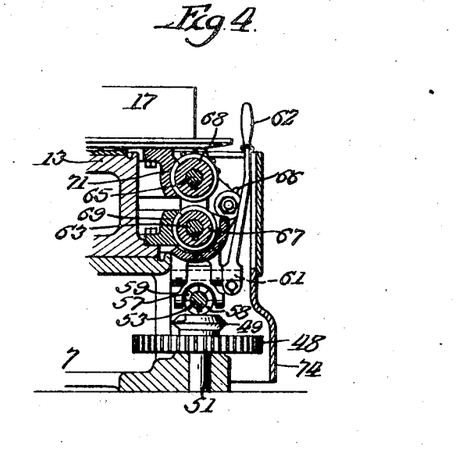
Fig. 4 is a vertical sectional view through this drive mechanism taken substantially on the line 4—4 of Fig. 2.

Mechanism driven from that just described for revolving the work table and tool carrier in the same direction, but at relatively different speeds, will now be described, reference being had particularly to Figs. 3 and 4. A spur gear 48 meshing with the gear 45 is fixed to a bevel gear 49 loose on the stub shaft 51. The gear 49 meshes with a bevel gear 52 loose on a shaft 53 journaled in bearings 54 of a gear-supporting bracket designated generally by reference character 55 secured by means of bolts 56 to a side of the base 7. A manually controlled clutch for connecting the bevel gear 52, which is constantly driven, to the shaft 53, consists of a collar 57 splined to the shaft 53 and having a serrated face 58 engageable with a corresponding face of the gear 52, a yoke 59 secured to the rock shaft 61 and having a trunnion connected with the collar 57, and a hand lever 62 fixed to the outer end of the shaft 61, adapted to be operated to engage and disengage the clutch. A shaft 63 journaled in the bracket 55 above the shaft 53 and in tangential relation to the spindle head holder 12 is connected with the shaft 53 through the intermediary of spur gears 64, and in turn drives a shaft 65 journaled in the bracket 55 above the shaft 63 through the agency of spur gears 66, arranged to drive the shaft 65 in the same direction as the shaft 63. Worm gears 67 and 68 fixed to the shafts 63 and 65 mesh with worm gears 69 and 71 rigidly secured, respectively, to the spindle head holder 12 and the work table 17, as shown clearly in Figs. 2 and 4.

By reason of the foregoing construction, when the clutch element 57 is engaged as shown, the work table and tool carrier will be revolved in the same direction about a common axis. It may be assumed that the work table and tool carrier are revolved in a clockwise direction, viewing Figs. 5 and 6, and as consequence, the cutter-holding spindles will be likewise revolved on their respective axes in a clockwise direction. The work table and tool carrier do not, however, revolve at the same rate of speed, as one travels faster than the other so as to cause a relative movement between the work holding device and the cutters which results in the performance of the surfacing operations. For this purpose the worm gear connections 67—69 and 68—71 are of different relative ratios, under the present arrangement the work table being revolved slower than the tool carrier. The speed of the cutter spindles and the relative speeds of the work table and tool carrier depend, of course, on the nature of the particular work to be machined, it being understood that the relative speeds of the parts mentioned may be such as is best suited for the work, the changes being made by changes in the gear train at different places in the machine and in the speed of the main drive shaft.

Figure 6:
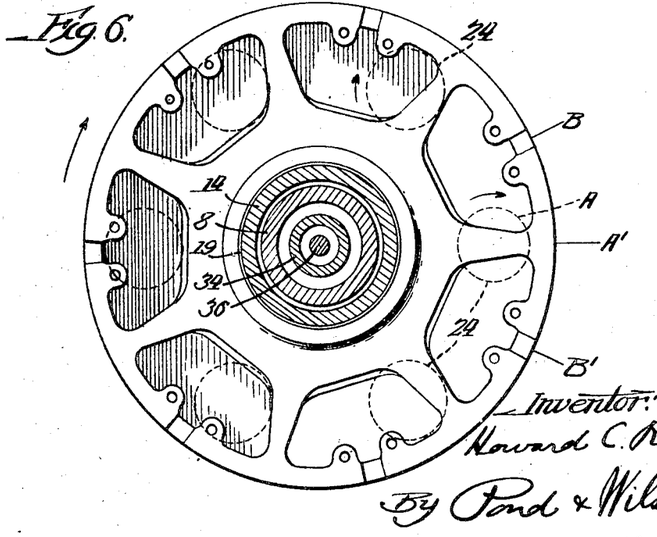

For illustration, the machine shown has been designed particularly to surface a cover plate face 72 of a transmission casing 73, the work table being constructed to carry seven workholding devices and six cutters being employed for the surfacing operation. When the motor shaft is driven 650 R. P. M., the cutters will be revolved at 29 R. P. M., the spindle or tool carrier at 2 R. P. M. and the work holding table at $\frac{7}{4}$ of the speed of the spindle head. It follows, therefore, that during one revolution of the spindle head a given cutter will gain with respect to a given work holder $\frac{1}{7}$ of a revolution or the distance between centers of two adjacent work-holding devices. By reason of this relative movement, the surfacing operation is performed and at one portion of the cycle of the work one of the cutters is for a certain period moving idly between two work-holding devices, this arc of its travel being termed a loading and unloading station. Referring to Figs. 5 and 6, it will be seen that the cutter carried by the spindle A is disposed directly above the point A' on the work table centrally intermediate two adjacent work-holding devices. Assuming that the tool carrier and work table are being revolved in the manner described, the cutter A has left the work on the holder B and is advancing to meet the work on the holder B'. The distance traveled by the cutter A from the time that it leaves the work at the holder B until it engages the work on the next preceding holder B' is termed the loading and unloading station. A casing or part to be surfaced having been mounted on the holder at B' after the cutter preceding the cutter A has left said holder B', the cutter A will advance on the casing carried by the holder B', gradually travel and leave the same when the loading station mentioned is reached. Thus, when the cutter A again reaches the point A' the work holder B' will only have reached the point B so that the cutter A is entirely in advance of and removed from the said holder B', thus permitting the work thereon to be removed and a new piece to be mounted on the holder which will be operated upon by the cutter next following the cutter A. Since the work table and spindle head are continuously revolved in this manner, a finished part will be removed from the machine at every ⅙ of a revolution of the spindle head, consequently since the latter revolves at 2 R. P. M. six parts will be finished during every two minutes. According to this gear ratio and the arrangement of the work holders and cutter spindles, the loading and unloading will occur at a permanent point with respect to the base of the machine. Should the speed of rotation be changed so that the work holders and cutter spindles are not revolved in the proper relative relation above described, the loading station will advance or recede, as the case may be, around the base.

A suitable housing designated by 74 may be provided for the gearing at the side of the machine and the worm gears may be enclosed by a housing 75. A chip ledge 76 secured to the work table carries the chips to a point at which they are removed by means, not shown, and a guard 77 which may extend substantially entirely around the work table is mounted on the gear housing 75 and serves to protect the operator from the revolving table and chip ledge and to prevent chips from falling therefrom.

It is believed that the foregoing conveys a clear understanding of the principles of my invention and of the objects prefaced above; and it should be understood that while I have illustrated but one embodiment of my improvements, various changes in the construction and design might be resorted to without departing from the spirit and scope of the invention as expressed in the appended claims.

I claim:

1. A circular milling machine comprising a work carrier and a tool carrier revolubly mounted and respectively equipped with a plurality of circumferentially arranged work holders and milling tools, and mechanism for continuously revolving the work and tool carriers and for causing, by such revolving movement, a relative movement in the plane of rotation between the work and the tools.

2. A circular milling machine comprising a work carrier and a tool carrier revolubly mounted and respectively equipped with a plurality of circumferentially arranged work holders and cutter spindles, and mechanism for continuously revolving the work and tool carriers at relatively different speeds.

3. A circular milling machine comprising a work carrier and a tool carrier respectively equipped circumferentially with work holders and tool carrying spindles, and mechanism for relatively moving the spindles and work to cause the latter to be operated upon by the tools and for simultaneously revolving the work and tool carriers during said operation to successively move the work holders to and from a loading station.

4. A circular milling machine comprising a plurality of circumferentially arranged work holders and milling cutters, the latter of which are adapted to surface in a common plane the work carried by the work holders, and mechanism for revolving the work holders and milling cutters as separate units at different speeds to successively move the work holders to and from a loading station and to allow certain of the milling cutters to operate on the work while said units are being revolved.

5. The combination of a base member provided with a central upstanding column and revoluble about the longitudinal axis of said column, a work carrier revoluble upon said base member and about said column and equipped with circumferentially arranged work holders, a tool carrier fixed to said column above the work carrier and equipped with circumferentially arranged tool carriers, and mechanism for revolving the base member and work carrier at different speeds while the tools of the tool carrier are operating on the work.

6. A circular milling machine comprising a revoluble work carrier circumferentially equipped with a plurality of work holders, an upright column passing substantially centrally through the work carrier, a tool carrier fixed to the column above the work carrier and circumferentially equipped with a plurality of cutter spindles having milling cutters, and mechanism for revolving the work carrier and said tool carrier column in the same direction and at relatively different speeds to effect continuous and simultaneously milling by a plurality of cutters in the plane of rotation.

7. A circular milling machine comprising a revoluble work carrier and tool carrier equipped respectively with a relatively different number of work holders and cutter spindles, and mechanism for so revolving the work and tool carriers that when each cutter spindle passes a given station it will be out of operative cutting relation to the adjacent work holders.

8. A circular milling machine comprising a revoluble work carrier and a tool carrier respectively equipped circumferentially with a plurality of work holders and cutter spindles, and mechanism for continuously revolving the work and tool carriers at relatively different speeds so that a plurality of cutting operations will be simultaneously performed during each rotation and the work holders and spindles will be successively moved past a given loading station at which each cutter spindle is out of operative cutting relation to the adjacent work holders.

9. In a circular milling machine, the combination of a revoluble work carrier and a tool carrier equipped respectively with a different number of work holders and cutter spindles, and means for revolving the work and tool carriers in the same direction at such relatively different speeds as to cause a given cutter spindle to gain with respect to a given work holder during one revolution of the tool carrier, approximately the distance between the medial line of two adjacent work-holders.

10. In a machine of the character described, the combination of a work carrier and a tool carrier concentrically and rotatably mounted one above the other and equipped with a plurality of circumferentially arranged work holders and cutter-holding spindles, the work holders and spindles being unequal in number, and means for revolving the work and tool carriers in the same direction at such different speeds as to cause the work holders and cutters to be relatively moved to effect the cuting operation and to cause each work holder as it passes a given station to move free from and intermediate two adjoining cutters so as to allow work to be removed from and mounted on the work holder.

11. In a circular milling machine, the combination of a work carrier and a tool carrier substantially co-axially and revolubly mounted one above the other and equipped respectively with a plurality of circumferentially arranged work holders and cutter-carrying spindles, and means for revolving said work and tool carrier simultaneously in the same direction and at such different speeds as to cause each work holder to be free at a given station to allow work to be removed from and mounted on said work carrier.

12. In a circular milling machine, the combination of a revoluble tool carrier and work carrier equipped respectively with a plurality of circumferentially arranged cutter-carrying spindles and work holders arranged so that the work will be carried in the path of the cutters, and means for simultaneously revolving the tool and work carriers in the same direction at different speeds whereby through difference in speed of the tool and work carriers the cutting operation will be performed.

13. The combination of a base having a central upright column, a work table revoluble about said column, a tool carrier superimposed above the work table and revoluble about said column, cutter spindles and work holders respectively mounted on the tool carrier and work table so that the cutters and work may travel in intersecting paths, and mechanism for relatively rotating the work table and tool carrier during which movement surface cutting in a common plane may be performed on work in a plurality of the work holders.

14. A circular milling machine, comprising a plurality of circumferentially arranged cutter spindles and work holders revoluble about a substantially common axis, and mechanism for simultaneously revolving said cutter spindles and work holders as separate units about said axis in the same direction at different relative speeds.

15. In a circular milling machine, a plurality of work holders constantly traveling in a circular path, and a plurality of surface milling cutters, one less in number than the work holders, constantly traveling in the same direction and in a circular path coinciding with that of the work holders but at a different speed than the work holder.

16. A circular milling machine comprising a constantly revolving work table carrying a plurality of circumferentially arranged work holders which as the table revolves are successively carried past a loading and unloading station, and a constantly revolving tool carrier equipped with a plurality of surface milling cutters, one less in number than the work holders, and traveling in a circular path coinciding with the path of the work holders and in the same direction and at a faster speed than the work holders so that each of the cutters but one in the vicinity of the loading and unloading station will be in substantially continuous operative relation to one of the work holders.

17. In a circular milling machine, a plurality of work holders constantly traveling in a circular path, a portion of which constitutes a loading and unloading station, a plurality of surface milling cutters constantly traveling in a circular path and past said station, the work holders and milling cutters while traveling in their respective circular paths being given a feed movement relatively to each other in a plane parallel with the plane of rotation, such feed movement being so timed that the work on each work holder will be continuously surfaced by a milling cutter while traveling said circular path from substantially the time the work leaves the loading station until it approaches within proximity to said station.

18. In a circular milling machine, a rotary work holding unit and a rotary cutter holding unit equipped respectively with a plurality of circumferentially arranged work holders and cutter spindles and mounted so that the work and spindles travel in coincident circular paths, and mechanism for revolving the work and cutter holding units continuously in the same direction and at different speeds so that a plurality of cutters will be continuously in operation on the work and the work holders are successively moved past a loading station and free from the cutters.

19. In a circular milling machine, a work table adapted to revolve about a central axis and equipped with a plurality of circumferentially arranged work holders, each adapted to carry its work in fixed relation to the work table, a tool carrying unit equipped with a plurality of circumferentially arranged cutter spindles each having a face plate milling cutter, the tool carrying unit being mounted to revolve about an axis within the circular path of the work holders so that the milling cutters will travel in a circular path intersecting that of the work, the milling cutters being set to surface in a common plane perpendicular to the axis of rotation of the tool carrying unit, and means for continuously revolving the work table and tool carrying unit in the same direction but at different speeds whereby a plurality of cutters will be in continuously surfacing operation and the work will be successively completed and carried to an unloading station.

20. A circular milling machine comprising a plurality of work holders and cutter spindles mounted to travel in co-axial circular paths and each cutter spindle equipped with a face milling cutter, and driving mechanism for simultaneously and continuously revolving the work holders and spindles about said axis at different speeds whereby a plurality of cutters will simultaneously operate on their respective work and the cutters will successively complete their cutting operations and be advanced to operate on the work carried by the next preceding work holder.

21. A circular milling machine comprising a base member having a central upright column and mounted to revolve about the axis of said column, a work table mounted on the base member to revolve about its central column and equipped with a plurality of circumferentially spaced work holders, a tool carrier fixed to the central column above the work table and equipped with a plurality of vertical cutter spindles, worm gears fixed to the base member and the work table respectively, and gearing for driving the worm gears simultaneously in the same direction and at different speeds.

22. A circular milling machine comprising a work table mounted to revolve about a central vertical axis and equipped with a plurality of circumferentially spaced work holders, a tool carrier above and co-axial with the work table and equipped with a plurality of circumferentially spaced vertical cutter spindles, a face plate milling cutter attached to the lower end of each spindle, the cutters being set to surface in a common plane perpendicular to the axis of rotation of the tool carrier, and mechanism for simultaneously revolving the work table and tool carrier about said central axis and at relatively different speeds.

23. In a circular milling machine, the combination of a work table equipped with a plurality of circumferentially spaced work holders and mounted to revolve about a central axis, a tool carrier equipped with a plurality of circumferentially arranged milling cutters and mounted to revolve about a central axis so that the milling cutters travel in a circular path intersecting the circular path of the work, means for revolving the cutters, and means for continuously revolving the work table and tool carriers at different speeds for effecting a relative feed movement between the cutters and work in a plane parallel with the plane of rotation thereof.

24. In a circular milling machine, a work table and a tool carrier co-axially mounted and equipped respectively with circumferentially arranged work holders and milling cutters, means for revolving the milling cutters, and means for continuously revolving the work table and the tool carrier about their common axis in the same direction and at relatively different speeds.

25. A machine of the character described comprising a base having a rigid central upright column, a supplemental base member revolubly mounted upon the base member and having a central upright column revoluble about the upright column of the base member, a work table revolubly mounted upon the supplemental base member and about its central column, a tool carrier mounted upon the central column of the supplemental base member above the work table and equipped with a plurality of circumferentially spaced vertical cutter spindles, and mechanism for revolving the supplemental base member and the work table relatively to each other.

26. A machine of the character described comprising a base having a rigid central upright column, a supplemental base member revolubly mounted upon the base member and having a central upright column revoluble about the upright column of the base member, a work table revolubly mounted upon the supplemental base member and about its central column, a tool carrier mounted upon the central column of the supplemental base member above the work table and equipped with a plurality of circumferentially spaced vertical cutter spindles, a motor mounted on the tool carrier with its driving shaft co-axial therewith, a central gear driven by the driving shaft of the motor and having a gearing connection with the cutter spindles, a shaft extending axially through the central column of the base member and driven from the motor shaft, and mechanism driven from the lower end of said central shaft for revolving the supplemental base member and the work table relatively to each other.

27. A machine of the character described comprising a base member having a rigid central upright column, a supplemental base member revolubly mounted upon the base member and having a central upright column revoluble about the upright column of the base member, a work table revoluble upon the supplemental base member and about its central column, a tool carrier mounted upon the central column of the supplemental base member above the work table and equipped with a plurality of circumferentially spaced vertical cutter spindles, a motor mounted on the tool carrier with its driving shaft co-axial with the same, a shaft driven from the driving shaft of the motor and extending down through the central column of the base member, and a driving connection between the lower end of said shaft and the supplemental base member and the work table for revolving the same.

28. A machine of the character described comprising a base having a rigid central upright column, a supplemental base member revolubly mounted upon the base member and having a central upright column revoluble about the upright column of the base member, a work table revolubly mounted upon the supplemental base member and about its central column, a tool carrier mounted upon the central column of the supplemental base member above the work table and equipped with a plurality of circumferentially spaced vertical cutter spindles, separate worm gears circumscribing and fixed to the supplemental base member and the work table respectively and driving mechanism for revolving said worm gears.

29. In a milling machine, a constantly revolving work table having a plurality of work holders traveling in a circular path, and a constantly revolving tool carrier having a plurality of milling cutters traveling in the same direction and in a circular path coincident with that of the work holders, the work holders and milling cutters being unequal in number and the relative speeds thereof being so timed that the work holders will successively pass a loading and unloading station at which the adjacent milling cutters will be out of operative relation to the work holder at such station and a plurality of the remaining milling cutters will be simultaneously in milling operation.

30. In a milling machine, a plurality of work holders and tool spindles continuously traveling in the same direction in coincident circular paths but at relatively different speeds, whereby a progressive movement in a plane parallel with the plane of rotation is effected between the tool spindles and work holders, constituting the feed movement.

31. In a circular milling machine, a rotary work table and a rotary tool carrier substantially coaxial and equipped respectively with a plurality of circumferentially arranged work holders and cutter spindles, there being one less cutter spindle than work holder, and mechanism for simultaneously and continuously revolving the work table and tool carrier in the same direction at such relative speeds that during one revolution of the tool carrier a given spindle will gain with respect to a given work holder a distance equal to substantially that between the centers of two adjacent work holders.

32. A circular milling machine comprising a plurality of work holders and cutter spindles continuously traveling in the same direction in circular paths at relatively different speeds so that a plurality of the cutters will continuously mill the work on a plurality of work holders and each cutter will be successively carried through an idle period known as a loading and unloading station between two adjacent work holders.

33. In a machine of the character described, the combination of a work table and a tool carrier respectively equipped with circumferentially spaced work holders and tool spindles, and mechanism for revolving the work table and tool carrier for causing by such rotation the holders and spindles to move relatively in a cutting operation.

34. In a machine of the character described, the combination of a plurality of circumferentially spaced tool spindles and work holders, and mechanism for moving the spindles and work holders as units to successively carry the work and tools past a loading station and for causing the work and tools to move relatively in a plane parallel with the plane of travel to perform the cutting operation.

35. A circular milling machine comprising cutter spindles and work holders mounted in circumferentially spaced relation, and mechanism for moving the spindles and work holders through a substantially circular path for effecting a feed movement between the cutter spindles and work holders during such travel.

36. In a machine of the character described, the combination of a work table and a tool carrier substantially concentrically mounted and respectively equipped with circumferentially spaced work holders and tool spindles, a motor concentric with said work table and tool carrier, and mechanism operated by the motor for relatively moving both the work table and tool carrier and relatively to each other.

37. In a machine of the character described, the combination of a concentric work table, tool carrier and motor, and mechanism operated by the motor for revolving the work table and tool carrier about their common axis at different relative speeds.

38. In a machine for the character described, the combination of a work table and a tool carrier respectively equipped with circumferentially spaced work holders and tool spindles, and mechanism for revolving the work table and tool carrier in the same direction and at different speeds.

HOWARD C. ROSE.